United States Patent [19]
Schwerdt

[11] Patent Number: 5,181,656
[45] Date of Patent: Jan. 26, 1993

[54] WATER RECIRCULATING APPARATUS

[76] Inventor: Gerald N. Schwerdt, 2146 Marshall Rd., Vacaville, Calif. 95687

[21] Appl. No.: 808,465

[22] Filed: Dec. 16, 1991

[51] Int. Cl.⁵ .............................................. F24D 3/00
[52] U.S. Cl. ................................. 237/8 C; 137/625.5; 236/93 R
[58] Field of Search .............. 126/362; 237/19; 236/93 R, 101 A, 101 R, 34.5; 137/625.5, 872

[56] References Cited

U.S. PATENT DOCUMENTS

| | | | |
|---|---|---|---|
| 1,173,484 | 2/1916 | Clay | 126/362 |
| 1,755,964 | 4/1930 | Morris | 237/19 X |
| 2,660,163 | 11/1953 | Whitney et al. | 126/362 |
| 2,706,085 | 4/1955 | Nallinger | 236/34.5 X |
| 3,850,200 | 11/1974 | Flebu | 137/625.5 |
| 4,347,972 | 9/1982 | Hillerstrom et al. | 237/19 X |
| 4,417,689 | 11/1983 | Sasaki | 236/93 R X |
| 4,606,302 | 8/1986 | Huemer et al. | 236/34.5 X |
| 4,883,225 | 11/1989 | Kitchens | 236/34.5 |

Primary Examiner—William E. Tapolcai
Attorney, Agent, or Firm—Leon Gilden

[57] ABSTRACT

An apparatus including a hot water tank directing an outlet conduit into a valve assembly, wherein the valve assembly includes a first and a second outlet conduit directed to a respective water faucet and a bypassing arrangement to the hot water tank respectively. The valve assembly includes a first chamber and second chamber utilizing a bi-metallic bellows shuttle valve to direct water selectively relative to the first and second conduits.

1 Claim, 4 Drawing Sheets

WATER RECIRCULATING APPARATUS

BACKGROUND OF THE INVENTION

1. Field of the Invention

The field of invention relates to hot water apparatus, and more particularly pertains to a new and improved water recirculating apparatus to permit the recirculation of unheated hot water initially from a hot water tank to be directed back to the hot water tank prior to heated water being directed through the associated valve assembly.

2. Description of the Prior Art

Recirculating apparatus for water of various types are utilized in the prior art for recirculating water for the saving of water and the like and such apparatus is exemplified in U.S. Pat. Nos. 4,809,728 to Chen, et al.; 4,875,623 to Garris; 4,901,915 to Sakakibara; and the water flow device of Wareham, U.S. Pat. No. 4,429,422.

Accordingly, it may be appreciated that there continues to be a need for a new and improved water recirculating apparatus as set forth by the instant invention which addresses both the problems of ease of use well as effectiveness in construction and in this respect, the present invention substantially fulfills this need.

SUMMARY OF THE INVENTION

In view of the foregoing disadvantages inherent in the known types of water recycling apparatus now present in the prior art, the present invention provides a water recirculating apparatus wherein the same is arranged to redirect unheated water from a hot water tank back to the tank limiting wastage of water. As such, the general purpose of the present invention, which will be described subsequently in greater detail, is to provide a new and improved water recirculating apparatus which has all the advantages of the prior art water recycling apparatus and none of the disadvantages.

To attain this, the present invention provides an apparatus including a hot water tank directing an outlet conduit into a valve assembly, wherein the valve assembly includes a first and second outlet conduit directed to a respective water faucet and a bypassing arrangement to the hot water tank respectively. The valve assembly includes a first chamber and second chamber utilizing a bi-metallic bellows shuttle valve to direct water selectively relative to the first and second conduits.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved water recirculating apparatus which has all the advantages of the prior art water recycling apparatus and none of the disadvantages.

It is another object of the present invention to provide a new and improved water recirculating apparatus which may be easily and efficiently manufactured and marketed.

It is a further object of the present invention to provide a new and improved water recirculating apparatus which is of a durable and reliable construction.

An even further object of the present invention is to provide a new and improved water recirculating apparatus which is susceptible of a low cost of manufacture with regard to both materials and labor, and which accordingly is then susceptible of low prices of sale to the consuming public, thereby making such water recirculating apparatus economically available to the buying public.

Still yet another object of the present invention is to provide a new and improved water recirculating apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
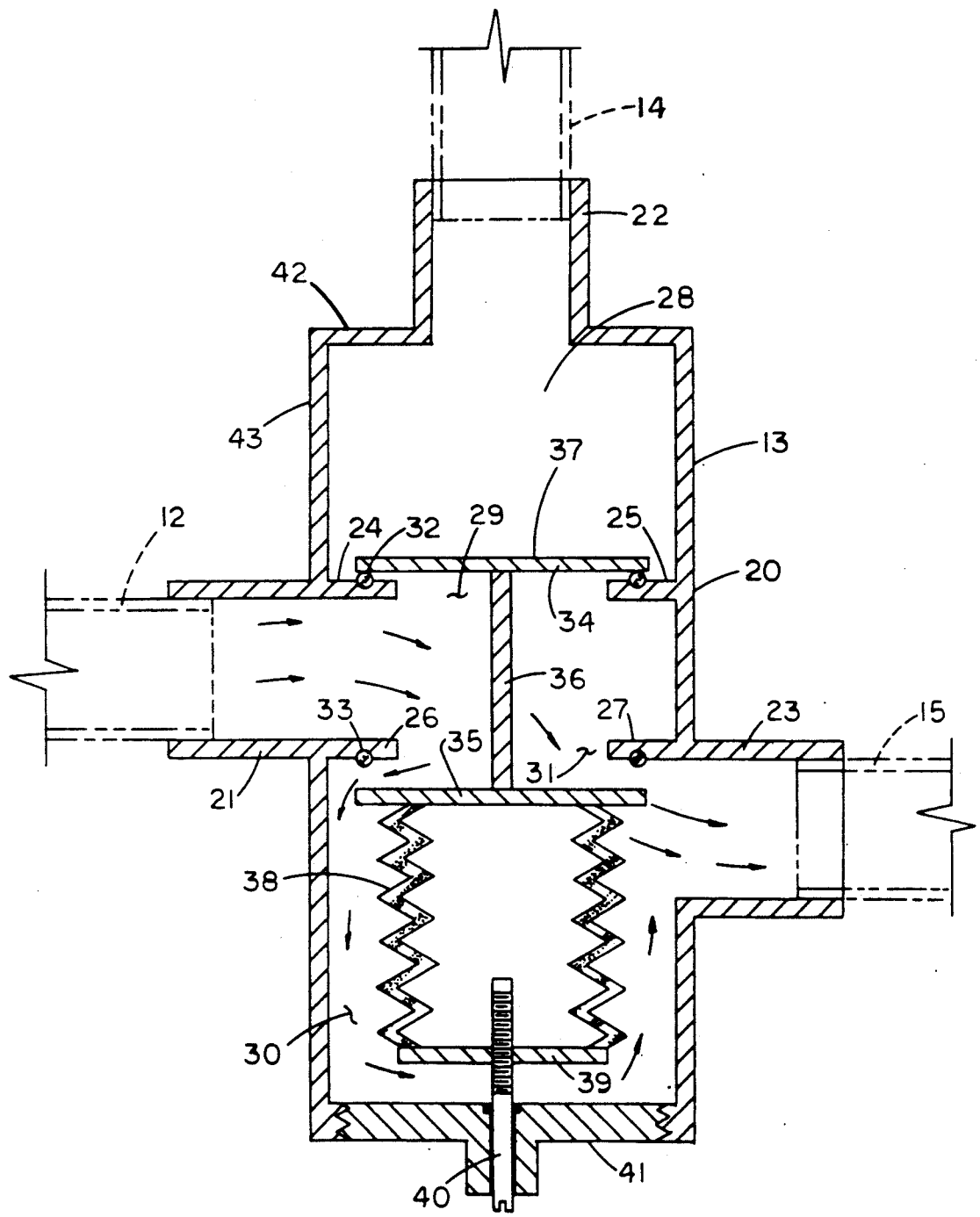
FIG. 1 is an orthographic cross-sectional illustration of the valve assembly in a first position.
Figure 2:
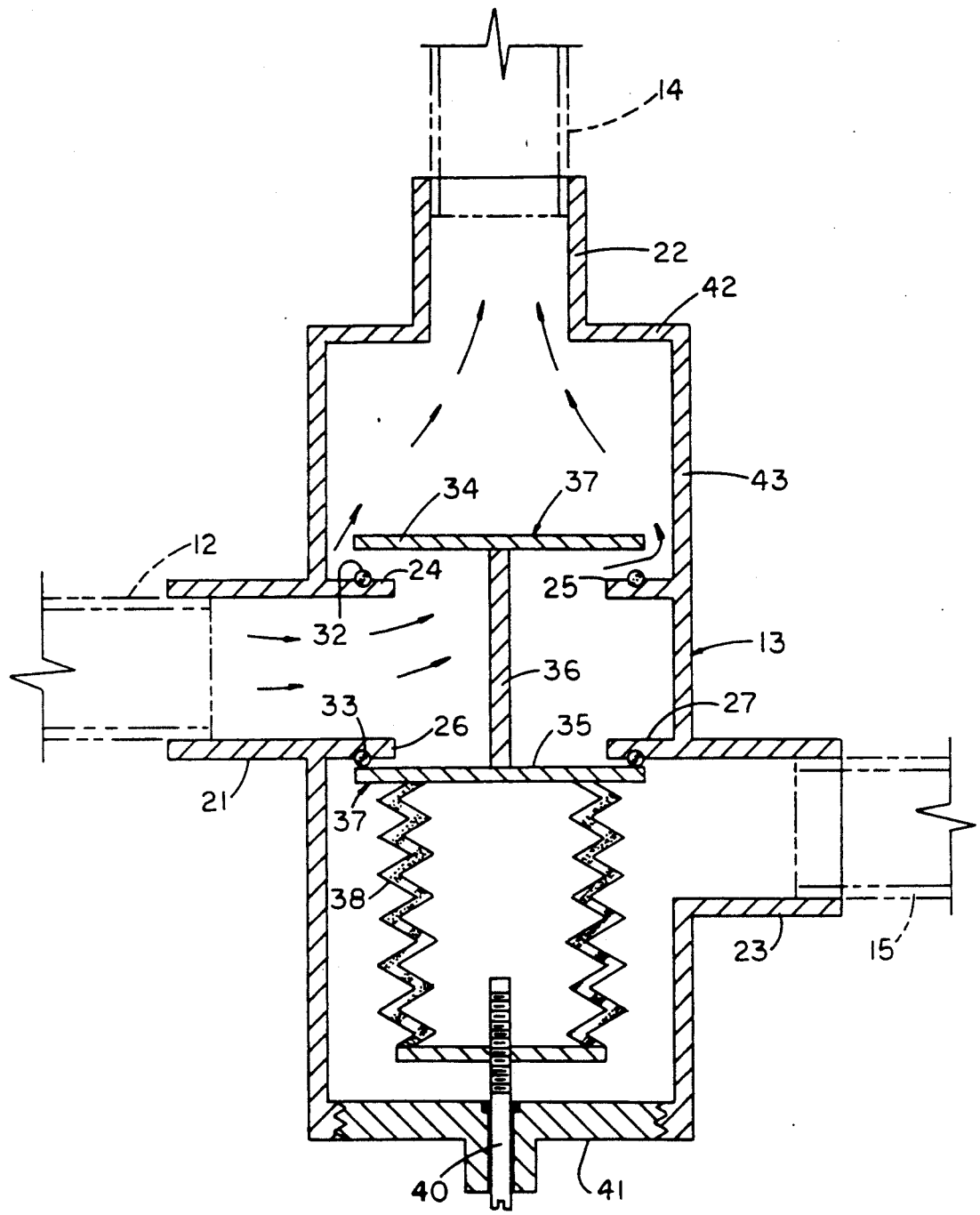
FIG. 2 is an orthographic cross-sectional illustration of the valve assembly in a second position.
Figure 3:
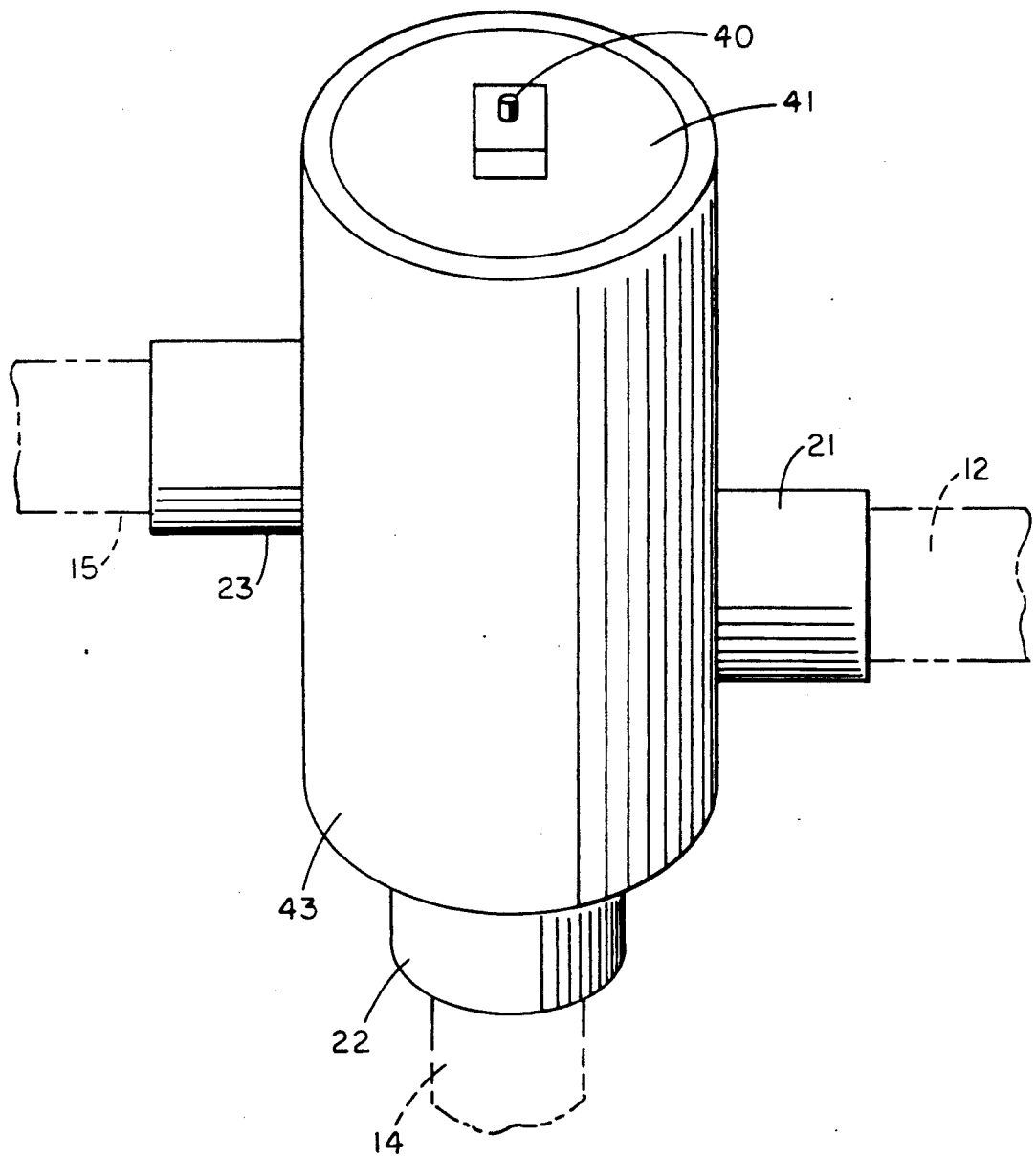
FIG. 3 is an isometric illustration of the valve assembly.
Figure 4:
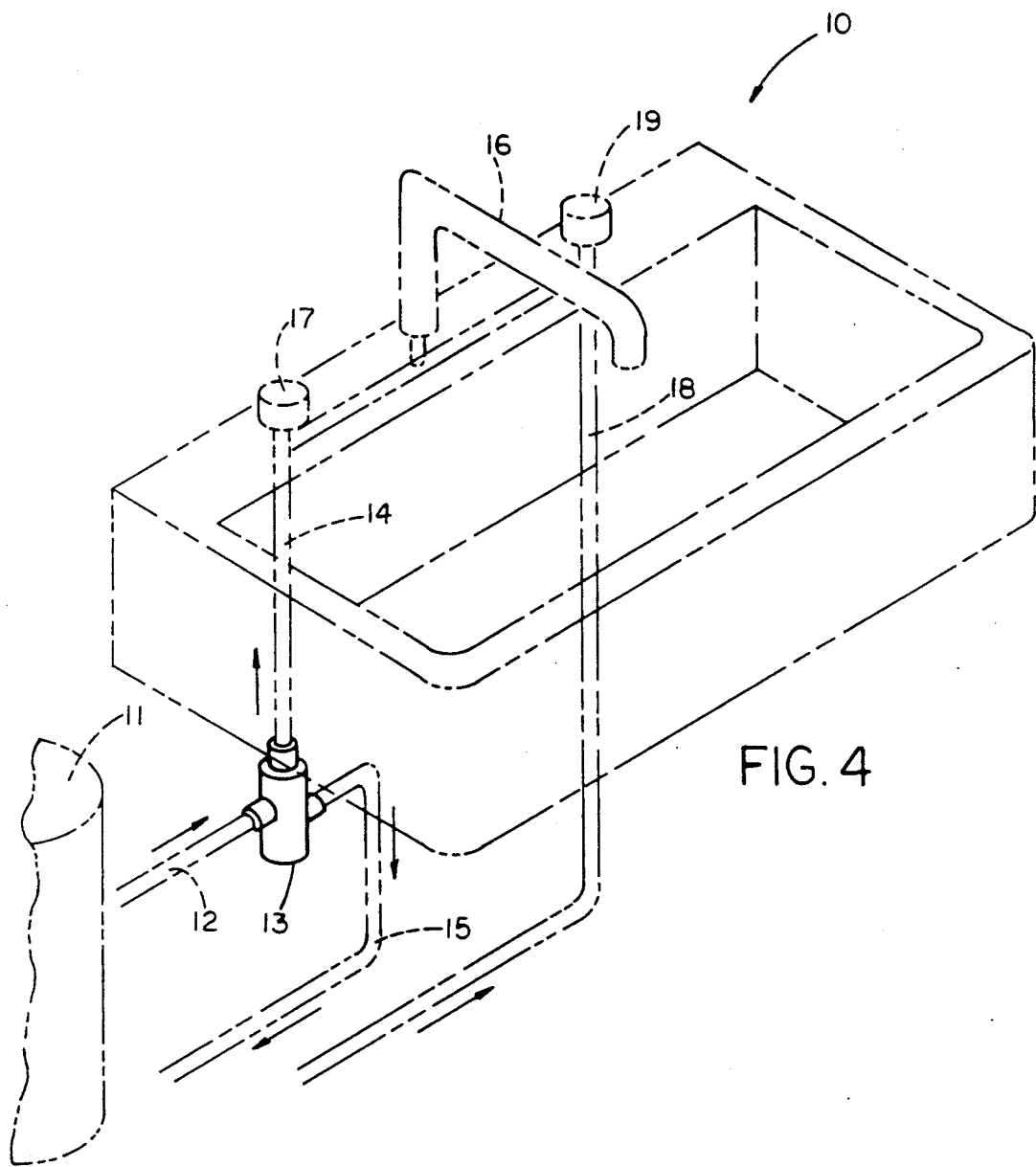
FIG. 4 is an isometric illustration of the apparatus in an assembled configuration.

With reference now to the drawings, and in particular to FIGS. 1 to 4 thereof, a new and improved water recirculating apparatus embodying the principles and concepts of the present invention and generally designated by the reference numeral 10 will be described.

More specifically, the water recirculating apparatus 10 of the instant invention essentially comprises a hot water tank 11 (see FIG. 4), including a hot water tank outlet conduit 12 directed into a valve assembly 13. The valve assembly 13 includes a first outlet conduit 14 directed from the valve assembly into a water faucet 16 through a water faucet first valve 17. A faucet second valve 19 directs water flow to the water faucet 16 from a water faucet cold water conduit 18, as illustrated. The valve assembly 13 includes a second outlet conduit 15 directed from the valve assembly back to the hot water tank for use as a bypass conduit. The valve assembly 13 is operative to initially sense water from the hot water tank 11 of an unheated type, such as that water within the conduit 12 between the hot water tank and the valve assembly 13, to direct such water back to the hot water tank through the second outlet conduit 15. The valve assembly 13 includes a valve assembly housing 20 formed with a first conduit tube 21 receiving the hot water tank outlet conduit 12, and a housing second conduit tube 22 receiving the first outlet conduit 14. The housing third conduit tube 23 fluidly receives the second outlet conduit 15. The housing first, second, and third conduit tubes 21, 22, and 23 respectively project interiorly of the housing, and wherein the first conduit tube 21 includes a first conduit first flange 24 cooperating with a first conduit third flange 25, and the use of a first conduit second flange 26 cooperating with a first conduit fourth flange 27. A first valve chamber 28 is formed within the valve assembly 13 above the first and third flanges 24 and 25, with the housing second conduit tube directed into the first valve chamber 28. A second valve chamber 30 is oriented within the valve assembly 13 and the housing 20 below the housing first conduit tube 21. As illustrated, the housing second conduit tube 22 is directed through a housing top wall 42, wherein the housing third conduit tube 23 is directed through a side wall 43 of the housing into the second chamber 30. A first valve chamber opening 29 is defined between the first and third flanges 24 and 25 coaxially aligned with an underlying second valve chamber opening 31 oriented between the second and fourth flanges 26 and 27. A respective first and second seal 32 and 33 are mounted about the first and second openings 29 and 31 respectively. A shuttle valve 37 is mounted within the first and second chambers, and includes a first opening plate 34 within the first chamber positioned above the first and second flanges 24 and 25 spaced from and parallel a second opening plate 35 positioned within the second chamber below the second and fourth flanges 26 and 27. A connecting web 36 coaxially mounted within the first and second openings is orthogonally oriented to and connecting the first and second opening plates 34 and 35 respectively. A bi-metallic bellows 38 is mounted between the second opening plate 35 and a housing bottom wall 41, with a bellows plate 39 mounted in a parallel relationship relative to the second opening plate 35 containing the bellows 38 therebetween, and a bellow plate adjusting rod 40 rotatably mounted in a fixed relationship within the housing bottom wall 41 threadedly directed through the bellows plate 39, whereupon rotation of the adjusting rod 40 effects a tensioning or loosening of the bellows relative to the shuttle valve 37, and more specifically to the second opening plate 35.

Initially as unheated water from the outlet conduit 12 is directed into the shuttle valve 37, the shuttle valve is in the first position with the first opening plate 34 in contiguous communication to the first seal 32 to direct fluid flow through the second valve chamber opening 31 into the valve assembly second outlet conduit 15 to direct such water back to the hot water tank 11. Upon water being heated, the bi-metallic bellows 30 is directed to a second position, wherein the second opening plate 35 is in contiguous communication with the second seal 33 and the first opening plate 34 is in a spaced relationship relative to the first and third flanges 24 and 25 to thereby direct fluid flow into the valve assembly first outlet conduit 14 and to the water faucet 16 to thereby direct only heated water to the water faucet conserving the initial wastage of unheated water that is typically found in contemporary plumbing.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water recirculating apparatus, comprising in combination, a hot water tank, the hot water tank including a hot water tank outlet conduit, and a valve assembly, the valve assembly in fluid communication with the outlet conduit from the hot water tank, and the valve assembly including a first outlet conduit and a second outlet conduit in fluid communication with the valve assembly, and the first outlet conduit directed into a first valve, and the first valve in fluid communication with a water faucet, the water faucet including a cold water conduit directed to the water faucet and a cold water faucet valve mounted between the water faucet and the cold water conduit, and the valve assembly second outlet conduit directed from the valve assembly to the hot water tank, and bypass means within the valve assembly for selectively directing water flow from the hot water tank to the first outlet conduit and the second outlet conduit when water is heated from a first temperature to a second temperature respectively, and the valve assembly includes a housing, the housing including a first conduit tube receiving the hot water tank outlet conduit, and a second conduit tube receiving the first outlet conduit, and a third conduit tube receiving the second outlet conduit, and including a side wall, a top wall, and a bottom wall, and the first valve chamber oriented within the valve assembly between the first conduit tube and the housing top wall, and the second conduit tube in fluid communication with the first valve chamber, and a second chamber oriented within the valve assembly between the second conduit and the housing bottom wall, and the third conduit tube in fluid communication with the second chamber, and bypass means includes a shuttle valve reciprocatably mounted and contained within the first chamber and second chamber to selectively direct fluid flow to the first chamber and the second chamber from the first conduit tube, and the first conduit tube includes a first conduit first flange within the housing mounted to the housing side wall, and the first conduit first flange aligned with a first conduit third flange, and a first valve chamber opening defined between the first conduit first flange and the first conduit third flange, and the first conduit tube including a first conduit second flange oriented parallel to and below the first conduit first flange, and a first conduit fourth flange in coplanar spaced alignment relative to the first conduit second flange to define a second valve chamber opening between the first conduit second flange and the first conduit fourth flange, and the shuttle valve includes a first opening plate positioned above the first valve chamber opening spaced from and parallel a second opening plate positioned below the second valve chamber opening within the second valve chamber, and wherein the first opening plate is positioned within the first valve chamber, and a connecting web orthogonally and integrally mounted to the first opening plate and the second opening plate, and the bypass means further including a bi-metallic bellows mounted to the second opening plate contained completely within the second chamber, and a bellows plate mounted to the bi-metallic bellows in a spaced parallel relationship relative to the second opening plate, and a bellows plate adjusting rod rotatably mounted through the housing bottom wall and threadedly directed through the bellows plate to effect selective tensioning of the bi-metallic bellows relative to the first opening plate and the second opening plate.

* * * * *